(12) United States Patent
Michael

(10) Patent No.: US 12,221,201 B2
(45) Date of Patent: Feb. 11, 2025

(54) AD HOC DYNAMIC DATA LINK REPEATER

(71) Applicant: AEROVIRONMENT, INC., Simi Valley, CA (US)

(72) Inventor: Gil Michael, Oak Park, CA (US)

(73) Assignee: AeroVironment, Inc., Arlington, VA (US)

(*) Notice: Subject to any disclaimer, the term of this patent is extended or adjusted under 35 U.S.C. 154(b) by 787 days.

(21) Appl. No.: 17/071,880

(22) Filed: Oct. 15, 2020

(65) Prior Publication Data

US 2021/0221503 A1 Jul. 22, 2021

Related U.S. Application Data

(63) Continuation of application No. 15/214,425, filed on Jul. 19, 2016, now Pat. No. 10,836,483.

(Continued)

(51) Int. Cl.

| | |
|---|---|
| *B64B 1/40* | (2006.01) |
| *B64C 27/02* | (2006.01) |
| *B64D 17/78* | (2006.01) |
| *H04B 1/3822* | (2015.01) |
| *H04B 7/185* | (2006.01) |

(Continued)

(52) U.S. Cl.
CPC ............ *B64B 1/40* (2013.01); *B64C 27/02* (2013.01); *B64D 17/78* (2013.01); *H04B 1/3822* (2013.01); *H04B 7/185* (2013.01); *B64U 2101/20* (2023.01); *B64U 2101/30* (2023.01); *F42C 13/00* (2013.01)

(58) Field of Classification Search
CPC ......... B64C 39/024; B64C 27/02; B64B 1/40; B64D 17/78; B64D 1/02; H04B 1/3822; H04B 7/185; H04B 7/18504; B64U 2101/20; B64U 2201/20; F42C 13/00; F41G 7/2206; F41G 7/306; G05D 1/0022
See application file for complete search history.

(56) References Cited

U.S. PATENT DOCUMENTS

| | | |
|---|---|---|
| 3,118,641 A | 1/1964 | Barish et al. |
| 3,288,402 A | 11/1966 | Icenbice, Jr. et al. |

(Continued)

FOREIGN PATENT DOCUMENTS

| | | | |
|---|---|---|---|
| CA | 2874766 A1 * | 12/2013 | ............ G01M 15/14 |
| CN | 101267612 A | 9/2008 | |

(Continued)

OTHER PUBLICATIONS

Intellectual Property Office of Singapore (IPOS) Search Report (Search_Rpt) and Written Opinion (WO) mailed Apr. 17, 2014 for related Singapore Patent Application No. 201203958-2 Entitled Dynamic Transmission Control for a Wireless Network by Grabowsky et al.; from Hungarian Patent Office; 13 pgs.

(Continued)

*Primary Examiner* — Assres H Woldemaryam
(74) *Attorney, Agent, or Firm* — Christopher R. Balzan, Esq.; Eric J. Aagaard, Esq.

(57) ABSTRACT

In one possible embodiment, a system capable of a self-propagating data link includes an unmanned vehicle having a data link transceiver and at least one deployable data link transceiver. The unmanned vehicle having a deployment means for deploying the at least one deployable data link transceiver.

6 Claims, 8 Drawing Sheets

Related U.S. Application Data

(60) Provisional application No. 62/194,442, filed on Jul. 20, 2015.

(51) Int. Cl.
  *B64U 101/20* (2023.01)
  *B64U 101/30* (2023.01)
  *F42C 13/00* (2006.01)

(56) References Cited

U.S. PATENT DOCUMENTS

| | | | |
|---|---|---|---|
| 3,945,338 | A | 3/1976 | Correa et al. |
| 4,117,267 | A | 9/1978 | Haberle et al. |
| 4,209,151 | A | 6/1980 | Saunders et al. |
| 4,635,884 | A | 1/1987 | Nohren et al. |
| 5,598,416 | A | 1/1997 | Yamada et al. |
| 5,864,560 | A | 1/1999 | Li et al. |
| 6,037,899 | A | 3/2000 | Weber et al. |
| 6,056,237 | A * | 5/2000 | Woodland ............ B64C 3/56 244/49 |
| 6,220,168 | B1 * | 4/2001 | Woodall ............ B63B 22/003 102/411 |
| 6,226,572 | B1 | 5/2001 | Tojima et al. |
| 6,272,325 | B1 | 8/2001 | Wiedeman et al. |
| 6,282,206 | B1 | 8/2001 | Hindus et al. |
| 6,293,202 | B1 * | 9/2001 | Woodall ............ F42B 19/10 102/386 |
| 6,471,160 | B2 | 10/2002 | Grieser et al. |
| 6,480,506 | B1 | 11/2002 | Gubbi |
| 6,640,739 | B2 | 11/2003 | Woodall et al. |
| 7,024,340 | B2 * | 4/2006 | Nichols ............ G05D 1/0027 455/39 |
| 7,039,367 | B1 | 5/2006 | Kucik |
| 7,062,250 | B1 | 6/2006 | Kosaka |
| 7,313,409 | B2 | 12/2007 | Iacono et al. |
| 7,412,517 | B2 | 8/2008 | Jorgensen |
| 7,502,342 | B2 | 3/2009 | Kim et al. |
| 7,526,303 | B2 | 4/2009 | Chary |
| 7,581,702 | B2 | 9/2009 | Olson et al. |
| 7,780,498 | B1 * | 8/2010 | Caspi ............ A63H 30/04 446/454 |
| 8,001,901 | B2 | 8/2011 | Bass et al. |
| 8,422,481 | B2 | 4/2013 | Hanuni |
| 8,686,325 | B2 | 4/2014 | Rastegar et al. |
| 9,008,002 | B2 | 4/2015 | Nanda et al. |
| 9,033,281 | B1 | 5/2015 | Adams |
| 9,084,276 | B2 | 7/2015 | Grabowsky et al. |
| 9,527,596 | B1 | 12/2016 | Adams et al. |
| 10,836,483 | B2 | 11/2020 | Michael |
| 2002/0052956 | A1 | 5/2002 | Seibold et al. |
| 2003/0164794 | A1 | 9/2003 | Haynes et al. |
| 2004/0109428 | A1 | 6/2004 | Krishnamurthy |
| 2004/0196367 | A1 | 10/2004 | Raymond et al. |
| 2005/0002362 | A1 | 1/2005 | Kim et al. |
| 2005/0078672 | A1 | 4/2005 | Caliskan et al. |
| 2005/0262216 | A1 | 11/2005 | Kashiwabara et al. |
| 2006/0009262 | A1 | 1/2006 | Hamm |
| 2006/0019610 | A1 | 1/2006 | Ue et al. |
| 2006/0120433 | A1 | 6/2006 | Baker et al. |
| 2007/0019569 | A1 | 1/2007 | Park et al. |
| 2007/0053308 | A1 | 3/2007 | DuMas et al. |
| 2008/0007447 | A1 * | 1/2008 | Vincent ............ F42B 12/365 342/57 |
| 2008/0027591 | A1 | 1/2008 | Lenser et al. |
| 2008/0112370 | A1 | 5/2008 | Kwon |
| 2008/0198060 | A1 | 8/2008 | Shani et al. |
| 2008/0263628 | A1 | 10/2008 | Norman et al. |
| 2008/0268855 | A1 | 10/2008 | Hanuni et al. |
| 2009/0154407 | A1 | 6/2009 | Jeong et al. |
| 2009/0164638 | A1 | 6/2009 | Jang et al. |
| 2009/0238096 | A1 | 9/2009 | DuMas et al. |
| 2010/0042269 | A1 * | 2/2010 | Kokkeby ............ G05D 1/0094 701/3 |
| 2010/0198514 | A1 | 8/2010 | Miralles |
| 2011/0065469 | A1 | 3/2011 | Grabowsky et al. |
| 2012/0043411 | A1 * | 2/2012 | Beck ............ B64C 39/024 102/374 |
| 2013/0085981 | A1 * | 4/2013 | Fuciarelli ............ F41G 7/007 706/52 |
| 2014/0379173 | A1 | 12/2014 | Knapp et al. |
| 2016/0214717 | A1 * | 7/2016 | De Silva ............ H04L 67/12 |

FOREIGN PATENT DOCUMENTS

| | | |
|---|---|---|
| EP | 1458141 A2 | 9/2004 |
| EP | 2073414 A1 | 6/2009 |
| EP | 2094047 A1 | 8/2009 |
| JP | 2003032739 A | 1/2003 |
| JP | 2006526932 A | 11/2004 |
| JP | 2004343759 A | 12/2004 |
| JP | 2006333360 A | 12/2006 |
| JP | 2008148039 A | 6/2008 |
| JP | 2009033678 A | 2/2009 |
| WO | 2004109996 A1 | 12/2004 |
| WO | 2007034428 A2 | 3/2007 |
| WO | 2008016846 A2 | 2/2008 |
| WO | 2009029608 A1 | 3/2009 |

OTHER PUBLICATIONS

Intellectual Property Office of Singapore (IPOS) Examination Report (Exam_Rpt) mailed Aug. 31, 2016 for related Singapore Patent Application No. 201203958-2 Entitled Dynamic Transmission Control for a Wireless Network by Grabowsky et al., from Intellectual Property Office of Singapore; 7 pgs.

Taiwan Intellectual Property Office (TIPO) English translation of Office Action (OA) for related Taiwan U.S. Appl. No. 99/130,704 Issued Jan. 28, 2014 Entitled Dynamic Transmission Control for a Wireless Network by Grabowsky et al.; from Taiwan Intellectual Property Office; 4 pgs.

The State Intellectual Property Office of the People's Republic of China (SIPO) English translation of First Office Action (OA1) for related Chinese Patent Application No. 201080051392.4 Issued Jul. 29, 2014 Entitled Dynamic Transmission Control for a Wireless Network by Grabowsky et al., from The State Intellectual Property Office of The People's Republic of China; 8 pgs.

The State Intellectual Property Office of the People's Republic of China (SIPO) English translation of Search Report (Search_Rpt) for related Chinese Patent Application No. 201080051392.4 Issued Jul. 21, 2014 Entitled Dynamic Transmission Control for a Wireless Network by Grabowsky et al., from The State Intellectual Property Office of The People's Republic of China; 2 pgs.

Australian Government IP Australia (IPAU) Patent Examination Report (Exam_Rpt) for for related Australian Patent Application No. 2010292909 Issued Sep. 11, 2014 Entitled Dynamic Transmission Control for a Wireless Network by Grabowsky et al., from Australian Government IP Australia; 3 pgs.

International Searching Authority; Patent Cooperation Treaty (PCT) International Search Report (ISR) for related PCT case Application No. PCT/US2010/048539 mailed May 30, 2011 Entitled Dynamic Transmission Control for a Wireless Network by Grabowsky et al., from Patent Cooperation Treaty, 3 pgs.

International Searching Authority; Patent Cooperation Treaty (PCT) Written Opinion (WO) for related PCT case Application No. PCT/US2010/048539 mailed May 30, 2011 Entitled Dynamic Transmission Control for a Wireless Network by Grabowsky et al., from Patent Cooperation Treaty; 5 pgs.

Japan Patent Office (JPO) machine translation of Office Action (10A) for related Japanese Patent Application No. 2012-528952 Entitled Dynamic Transmission Control for a Wireless Network by Grabowsky et al.; Issued Feb. 6, 2014 from Japan Patent Office; 3 pgs.

Taiwan Intellectual Property Office (TIPO) English translation of Search Report (Search_Rpt) for related Taiwan Patent Application No. 99130704 Entitled Dynamic Transmission Control for a Wireless Network by Grabowsky et al.; dated Jan. 24, 2014 from Taiwan Intellectual Property Office; 1 pg.

(56) References Cited

OTHER PUBLICATIONS

The State Intellectual Property Office of the People's Republic of China (SIPO) English translation of Second Office Action (OA2) for related Chinese Patent Application No. 201080051392.4 Issued Jun. 8, 2015 Entitled Dynamic Transmission Control for a Wireless Network by Grabowsky et al., from The State Intellectual Property Office of The People's Republic of China; 4 pgs.
USPTO Non-Final Office Action (NFOA1) mailed Apr. 25, 2013 for related U.S. Appl. No. 12/878,989, filed Sep. 9, 2010, Inventor Grabowsky, et al., Issued as U.S. Pat. No. 9,084,276; 24 pgs.
USPTO Final Office Action (FOA) mailed Dec. 30, 2013 for related U.S. Appl. No. 12/878,989, filed Sep. 9, 2010, Inventor Grabowsky, et al., 23 pgs.
USPTO Non-Final Office Action (NFOA2) mailed Jun. 23, 14 for related U.S. Appl. No. 12/878,989, filed Sep. 9, 2010, Inventor Grabowsky, et al., 29 pgs.
USPTO Final Office Action (FOA) mailed Dec. 22, 2016 for related U.S. Appl. No. 14/702,445, filed May 1, 2015, Inventor Grabowsky, et al.; 24 pgs.
USPTO Non-Final Office Action (NFOA1) mailed May 16, 2016 for related U.S. Appl. No. 14/702,445, filed May 1, 2015, Inventor Grabowsky, et al.; 28 pgs.
Canadian Intellectual Property Office (CIPO) First Office Action (OA1) and Search History for related Canadian Patent Application No. 2784255 Entitled Dynamic Transmission Control for a Wireless Network by Grabowsky et al.; Issued Oct. 3, 2016; from Canadian Intellectual Property Office; 5 pgs.
European Patent Office (EPO) extended European Search Report (eESR) for related European Patent Application No. 10816208.2 Entitled Dynamic Transmission Control for a Wireless Network by Grabowsky et al.; Issued Sep. 21, 2016; from European Patent Office; 9 pgs.
The State Intellectual Property Office of the People's Republic of China (SIPO) English translation of Third Office Action (OA3) for related Chinese Patent Application No. 201080051392.4 Issued Feb. 19, 2016 Entitled Dynamic Transmission Control for a Wireless Network by Grabowsky et al., from The State Intellectual Property Office of The People's Republic of China; 4 pgs.
Taiwan Intellectual Property Office (TIPO) English translation of Office Action (OA1) for related Taiwan Divisional Patent Application No. 104106303 Issued May 20, 2016 Entitled Dynamic Transmission Control for a Wireless Network by Grabowsky et al.; from Taiwan Intellectual Property Office; 7 pgs.
Taiwan Intellectual Property Office (TIPO) English translation of Search Report (Search_Rpt) for related Taiwan Divisional Patent Application No. 104106303 Issued May 19, 2016 Entitled Dynamic Transmission Control for a Wireless Network by Grabowsky et al.; from Taiwan Intellectual Property Office; 1 pg.
International Searching Authority; Patent Cooperation Treaty (PCT) International Search Report (ISR) and Written Opinion (WO) for PCT case Application No. PCT/US2016/043025 mailed Feb. 6, 2017 Entitled Ad Hoc Dynamic Data Link Repeater by Michael from Patent Cooperation Treaty; 17 pgs.
Australian Government IP Australia (IPAU) Patent Examination Report (Exam_Rpt) for for related Australian Patent Divisional Application No. 2016203891 Issued May 25, 2017 Entitled Dynamic Transmission Control for a Wireless Network by Grabowsky et al., from Australian Government IP Australia; 3 pgs.
The State Intellectual Property Office of the People's Republic of China (SIPO) English translation of Fourth Office Action (OA4) for related Chinese Patent Application No. 201080051392.4 Issued Jan. 5, 2017 Entitled Dynamic Transmission Control for a Wireless Network by Grabowsky et al., from The State Intellectual Property Office of The People's Republic of China; 10 pgs.
The State Intellectual Property Office of the People's Republic of China (SIPO) English translation of Fifth Office Action (OA5) for related Chinese Patent Application No. 201080051392.4 Issued Sep. 5, 2017 Entitled Dynamic Transmission Control for a Wireless Network by Grabowsky et al., from The State Intellectual Property Office of The People's Republic of China; 3 pgs.
European Patent Office (EPO) extended Office Action (OA) for related European Patent Application No. 10816208.2 Entitled Dynamic Transmission Control for a Wireless Network by Grabowsky et al.; Issued Jul. 11, 2017 from European Patent Office; 5 pgs.
Japan Patent Office (JPO) English translation of First Office Action (1OA) for related Japanese Patent Divisional Application No. 2015-021086 Entitled Dynamic Transmission Control for a Wireless Network by Grabowsky et al.; Issued Jun. 14, 2016 from Japan Patent Office; 3 pgs.
Japan Patent Office (JPO) English translation of Second Office Action (2OA) for related Japanese Patent Divisional Application No. 2015-021086 Entitled Dynamic Transmission Control for a Wireless Network by Grabowsky et al.; Issued Jun. 20, 2017 from Japan Patent Office; 4 pgs.

\* cited by examiner

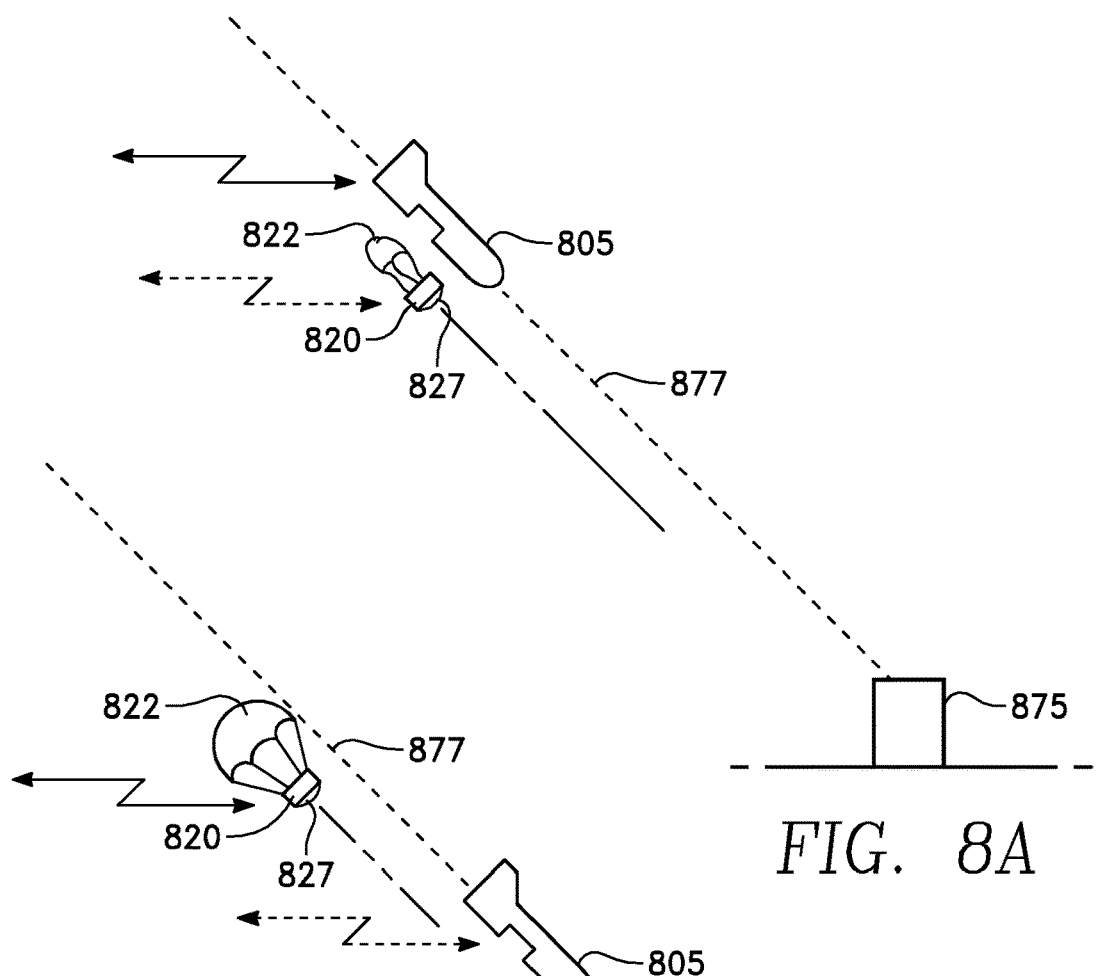
FIG. 8A
FIG. 8B
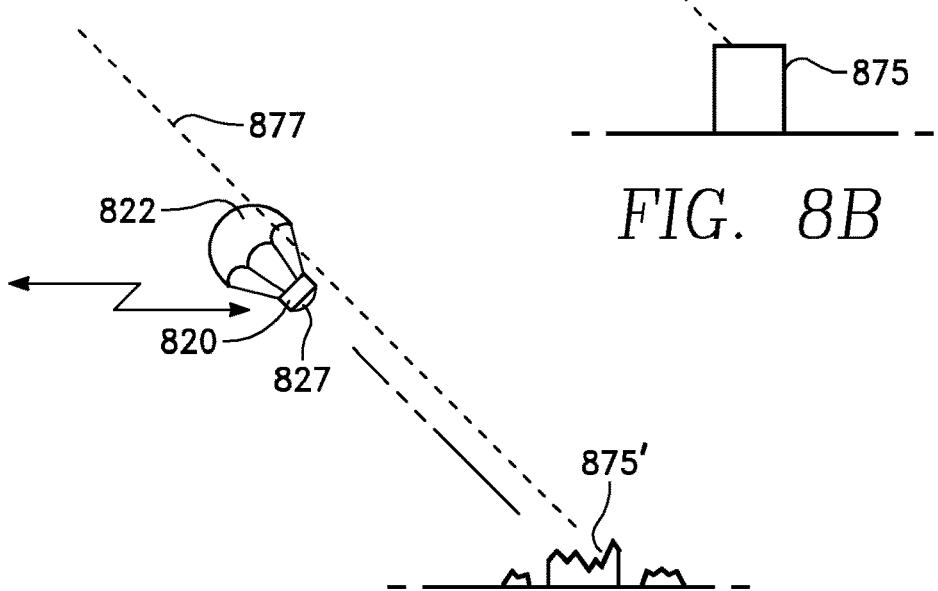
FIG. 8C

AD HOC DYNAMIC DATA LINK REPEATER

CROSS REFERENCE TO RELATED APPLICATION

The present application is a continuation of a U.S. Non-Provisional patent application Ser. No. 15/214,425, filed Jul. 19, 2016, by Gil MICHAEL, entitled AD HOC DYNAMIC DATA LINK REPEATER, which claims the benefit of U.S. Provisional Application 62/194,442, filed Jul. 20, 2015, by Gil MICHAEL, entitled AD HOC DYNAMIC DATA LINK REPEATER, which are both herein incorporated by reference in their entireties.

The present application is also related to U.S. patent application Ser. No. 14/702,445, by Grabowsky, et al., entitled DYNAMIC TRANSMISSION CONTROL FOR A WIRELESS NETWORK which is a continuation of U.S. patent application Ser. No. 12/878,989, issued as U.S. Pat. No. 9,084,276, by Grabowsky, et al., entitled DYNAMIC TRANSMISSION CONTROL FOR A WIRELESS NETWORK, which claims the benefit of U.S. Provisional Application No. 61/241,854, filed on Sep. 11, 2009, by Grabowsky, et al., entitled DYNAMIC TRANSMISSION CONTROL FOR A WIRELESS NETWORK, all herein incorporated by reference in their entireties.

BACKGROUND

Small Unmanned Vehicle Systems, such as UAVs, can accomplish their missions using Digital Data Link (DDL) communications. For example, an unmanned aerial vehicle or UAV transmits via the DDL a large amount of data (video) to a ground controller, with a small amount of data being transmitted to the UAV.

Moreover, it is critical that many of the DDL signals be real time. To control a remotely piloted vehicle, the operator receives, views, and mentally processes real time video, and then physically responds, i.e. moves a control stick, to transmit control signals to the vehicle, which are acted upon by the vehicle. It requires full motion real time data in both directions.

In addition, for UAVs, the DDL must satisfy a number of operational scenarios not present in traditional system. In some scenarios, the UAV can extend beyond the line-of-sight of the operator. This can occur as a result of obstacles such as terrain features, buildings, or the curvature of the earth.

In conventional communication systems, loss of signal resulting from these obstacles can be mitigated by stronger signal transmission, changing the modulation, or by using relay stations. Stronger signal transmission may not be desirable if the UAV, or the operator is located in a hostile environment, or an element of surprise is desired. Further, if the power budget of the UAV is limited, the additional power consumption required for a stronger signal may be prohibitive. With another potential mitigating solution, changing the modulation, it may not be a practical solution if the available time window for transmission is short. Providing additional relay stations is yet another potential solution; however, additional relay stations necessitate additional infrastructure (permanent or temporary), requiring additional planning, coordination, and deployment of resources. Where possible additional relay stations increase costs and consume resources, thus ultimately limiting the utility of the UAV. Moreover, additional relay stations, either permanent or temporary, may not even be possible or desirable in certain geographic areas, regardless of their availability. Such stations may also be prohibitive from a cost standpoint when temporary, ad hoc communication scenarios are required.

What is needed are methods and features that enable aerial and terrestrial nodes to maintain data link communication without requiring line-of-sight communication. Furthermore what is needed is a low cost solution to overcome the limitations imposed by alternative methods.

SUMMARY

In one possible embodiment, a system capable of a self propagating data link includes an unmanned vehicle having a data link transceiver and at least one deployable data link transceiver. The unmanned vehicle having a deployment means for deploying one or more deployable data link transceiver/s.

BRIEF DESCRIPTION OF THE DRAWINGS

The features and advantages of the present invention will be better understood with regard to the following description, appended claims, and accompanying drawings where:

FIGS. 8A-8C are simplified illustrations of a scenario in which a deployable data link transceiver with a sensor is deployed to improve target damage assessment and/or mitigate ECM countermeasures.

DESCRIPTION

Figure 1:
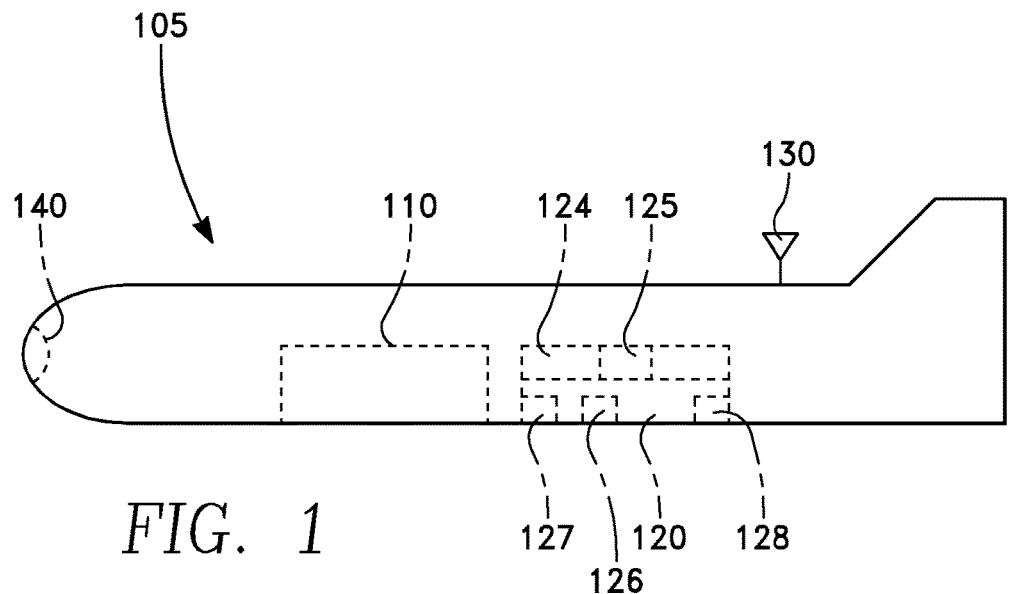
FIG. 1 is a side view showing a simplified illustration of an unmanned aerial vehicle.

FIG. 1 is a side view showing a simplified illustration of an unmanned aerial vehicle or UAV 105. In one embodiment shown in FIG. 1, in addition to its own data link transceiver 130, an unmanned vehicle, such as a UAV 105 is provided with one or more deployable data link transceivers 120. The unmanned vehicle, such as the UAV 105 includes a deployment means 125 for deploying the one or more deployable data link transceivers 120. A deployable data link transceiver 120 may be deployed for example as by jettisoning it from the UAV 105. The deployment means 125 may be any known in the art, such as mechanical ejection (including stored potential energy, e.g. spring loading), pressurized gas, pyrotechnic, electromagnetic, airstream release, etc. Some form of an airborne loitering means 124, discussed further below, is typically associated with the deployable data link transceiver 120, though this is not required in all situations.

Figure 2:
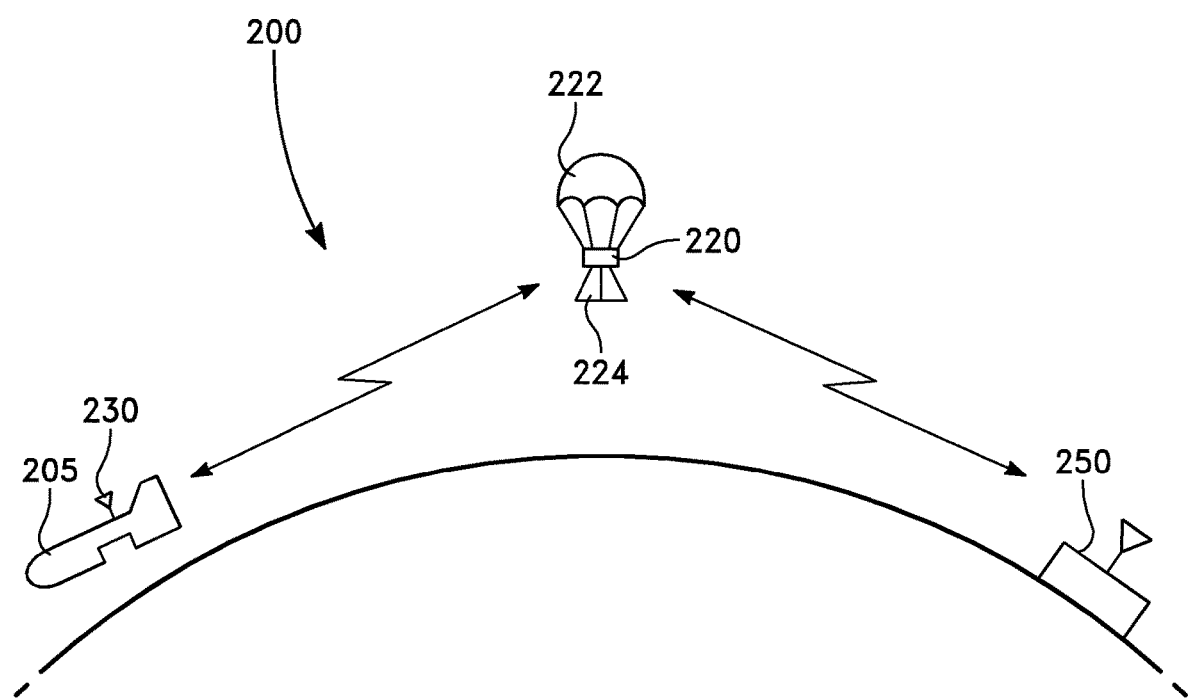
FIG. 2 is a simplified illustration of a scenario where a deployable data link transceiver is deployed to improve data link integrity in which the curvature of the earth obstructs line of sight communication.

As shown in FIG. 2, a deployed data link transceiver 220 is used apart from the UAV 205 to relay data between the UAV 205 and a user 250, such as a UAV controller. The deployed data link transceiver 220 may be a node that either directly, or indirectly, relays data from the UAV 205 to a user 250. Depending on the expected topography associated with a particular navigation path, the UAV 205 may be equipped with one or more deployable data link transceivers 220 in addition to its own data link transceiver 230 for deployment in advantageous locations along its navigation path. This can help to ensure favorable data link continuity throughout the navigation path. For example, a deployable data link transceiver 220 may be deployed at a waypoint along the navigation path prior to an anticipated loss of line of sight communication. Thus, the UAV 205 is capable of forming a self propagating data link, one where the UAV 205 leaves behind it own data link nodes to maintain a stable data link. This is especially advantageous in situations where a stable real time data link would not otherwise be possible due to topography or other unfavorable transmission environment.

Additionally or alternatively, a deployable data link transceiver 120 may be deployed if it is sensed that the data link is falling below an acceptable threshold. This may occur by the UAV 205 itself sensing and deciding to deploy deployable data link transceiver 220. Or, in some implementations the controller 250, or any intermediate relay node may sense and/or request or command deployment of a deployable data link transceiver 220.

As depicted in the simplified illustration of FIG. 2, in some embodiments, the deployable data link transceiver 220 is a component of a system 200 which includes a UAV 205 having its own data link transceiver 230 and at least one deployable data link transceiver 220. As shown in the embodiment of FIG. 2, the deployable data link transceiver 220 further includes a parachute 222 as a means for airborne loitering. In various embodiments, the airborne loitering means may be a descent inhibiting device to control the descent by retarding the descent of the deployable data link transceiver 220 after deployment from the UAV 205, such as, for example, an auto rotation apparatus (not shown), such as a whirligig, to slow the descent of the deployable data link transceiver 220. The configuration of the structure containing the deployable data link transceiver 220 may itself be a descent inhibiting device, or it may be attached to, or otherwise included with the deployable data link transceiver 220, or a structure containing the deployable data link transceiver 220.

In some embodiments, the airborne loitering means may be a balloon 426 (illustrated in FIG. 4) which may be lighter than ambient air to keep the deployable data link transceiver 220 aloft at or near a desired altitude after deployment from the UAV 205. In other embodiments, the balloon 426 (FIG. 4) may only retard the regular descent of the deployable data link transceiver 220 to the ground.

In some embodiments, the deployable data link transceiver 220 may include landing gear 224, to reduce impact with the ground. Such a mechanism may be convention impact absorbing mechanisms, such as elastic materials, e.g. spring, compressive materials, e.g. foam, balloons, or even sacrificial materials. It may also be configured to land in, or be caught up in, a tree or other vegetation to increase its height above the ground to improve its ability to transmit and receive radio signals. In such an embodiment, the deployable data link transceiver 420b (FIG. 4) may include a catch device, or other arresting apparatus, such as a hook or set of hooks 424h, attached to, or as the landing gear 424, which can attach to a tree 50, or other above ground vegetation when landing. In still other embodiments, the landing gear may additionally, or alternatively, function to ensure that the deployable data link transceiver 220 ultimately lands with favorable positioning, height, or orientation with respect to the ground, for example. In such embodiments, the deployable data link transceiver 220 may continue to function after falling to the earth.

In still further embodiments, the landing gear 224, or other structure, or structural means, associated with the deployable data link transceiver 220, may provide buoyancy, or flotation, for aquatic environments. This may be used for continued transmission, or for recovery of the deployable data link transceiver 220, in aquatic environments.

Referring to FIG. 1, a typical deployable data link transceiver 120 would contain a power source 128, such as a battery, to power the deployable data link transceiver 120 after deployment. Once deployed, the deployable data link transceiver 120 functions until the power source 128 is exhausted, or it is commanded to stop, or to turn off. Some embodiments may have a regenerative power source, e.g. solar/wind.

In some embodiments, the deployable data link transceiver 120 further comprises a functionality inhibiter 126 so that upon completion of the task, the deployable data link transceiver 120 will not work. In various embodiments, this may be accomplished by adapting the deployable data link transceiver 120, such as by programming the deployable data link transceiver 120 to erase software, such as proprietary or sensitive mission data, functional programming, encryption keys, or other sensitive data. In yet other embodiments, the deployable data link transceiver 120 may be constructed with to physically self-destruct upon completion of its task. Such a mechanism could employ electrical, magnetic, pyrotechnic, chemical, mechanical, or other forces.

A typical UAV 105 would include a visual sensor 140. In addition, in some embodiments the deployable data link transceiver 120 could also include a sensor(s) 127, such as visual sensor 127. The visual sensor 127 provides additional visual intelligence, surveillance, and reconnaissance capability, which can be used as a secondary or a back up to the unmanned vehicle's capability, or as primary source for additional information. A few of the many possible implementations are described further below with reference to FIGS. 6-8.

In addition some embodiments of the deployable data link transceiver 120 could contain a radiation sensor 127 so that the deployable data link transceiver 120 can be dropped into nuclear disaster cleanup sites to monitor radioactivity levels. Thus, rather than sending an unmanned vehicle into a disaster site and exposing it to radiation possibly necessitating decontamination of the unmanned vehicle (aerial or ground), a deployable data link transceiver 120 could be dropped, or projected into the disaster cleanup site to obtain radioactive, or other sensor data. In still other embodiment, it may contain appropriates sensors for a research or other mission in difficult environments, such as a volcano, an ocean/aquatic, a desert, a forest, or another disaster site.

FIG. 2 shows a simplified illustration of a potential scenario in which a deployable data link transceiver 220 is deployed to improve data link integrity. In this scenario, line of sight communication is not possible due to natural topology, such as curvature of the earth, hilly terrain, etc.

Figure 3:
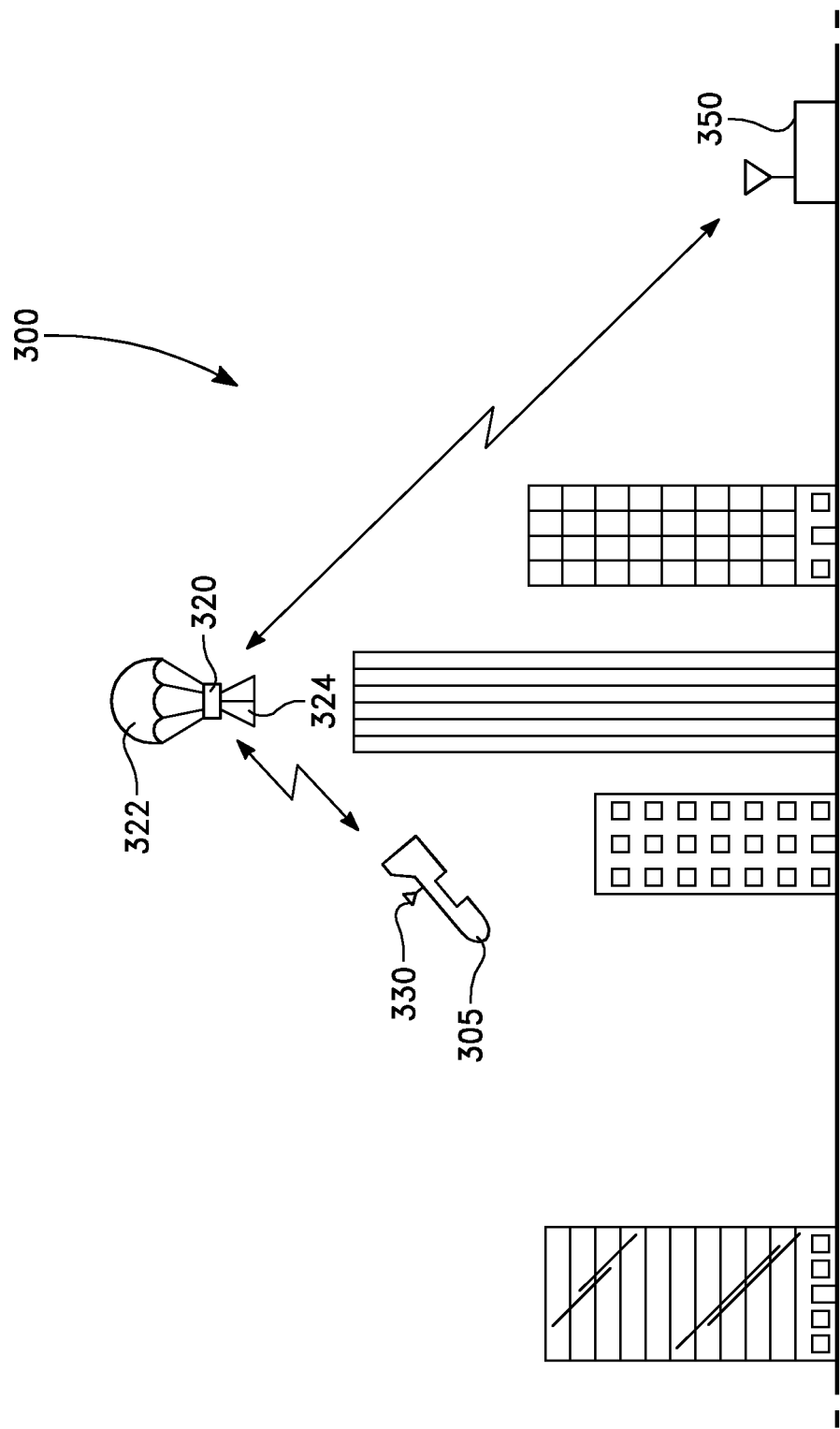
FIG. 3 is a simplified illustration of a scenario in which a deployable data link transceiver is deployed to improve data link integrity where a man-made obstruction obstructs line of sight communication.

FIG. 3 shows a simplified illustration of another potential scenario in which a deployable data link transceiver 320 is deployed to improve data link integrity. In this scenario, man-made obstructions, such as buildings, bridges, etc., impair line of sight communication.

Figure 4:
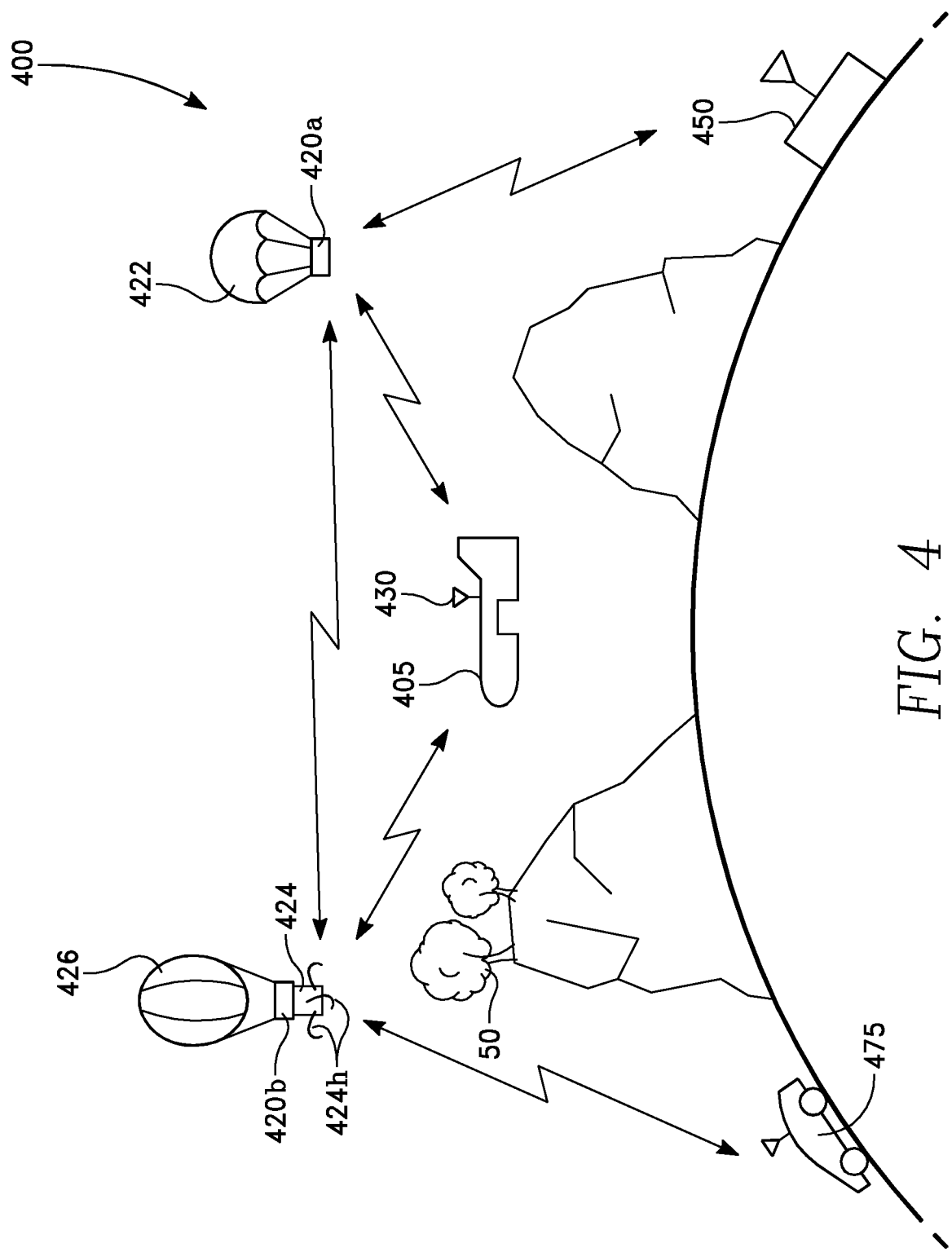
FIG. 4 is a simplified illustration of a scenario in which a deployable data link transceiver is deployed to improve data link integrity where terrain features obstruct line of sight communication.

FIG. 4 shows a simplified illustration of yet another potential scenario in which deployable data link transceivers 420a and 420b are deployed to improve data link integrity. In this scenario, multiple obstructions (either natural or man-made) impair line of sight communication. Data link integrity is provided between an unmanned ground vehicle 475 and a controller 450 by deploying a first deployable data link transceiver 420a with parachute 422 from the UAV 405, and deploying a second deployable data link transceiver 420b carried by balloon 426 from the unmanned ground vehicle 475, or alternatively from a loitering UAV 405.

Figure 5:
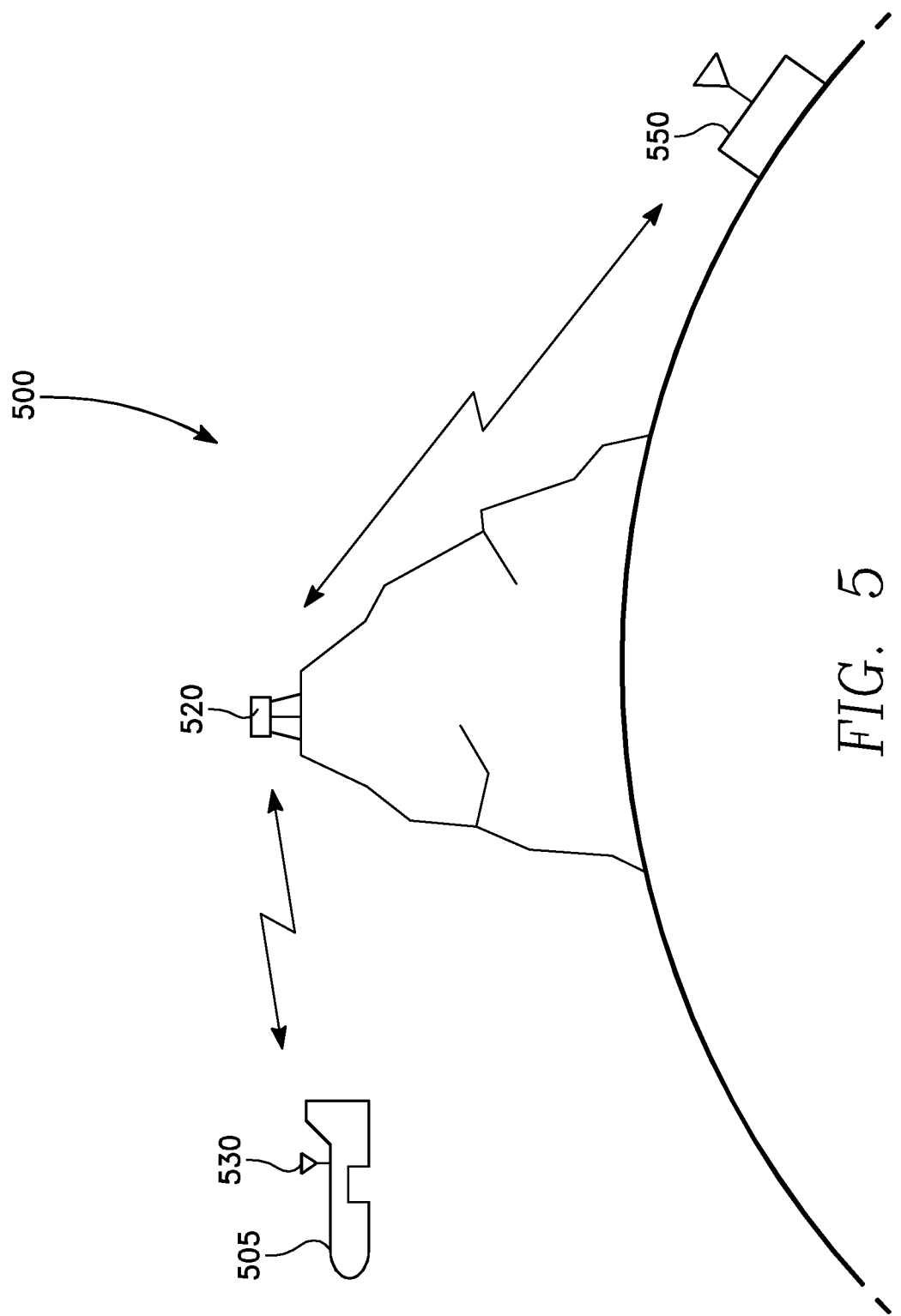
FIG. 5 is a simplified illustration of a scenario in which a deployable data link transceiver is deployed to improve data link integrity where terrain features obstruct line of sight communication.

Shown in FIG. 5 is an example an embodiment after deployment onto a hill or other high ground to facilitate line-of-sight transmissions. The high ground may be selected for a desired mission to improve communications quality, range, and/or efficiency. In one potential scenario, it is possible that the deployment of the UAV deployable data link transceiver 520 occurs during the mission (e.g. a detour enroute to the destination, or target of the UAV 505). Such a deployment may be done with, or without a parachute.

Although shown with reference to scenarios in which line of sight transmission is blocked completely or partially, one or more deployable data link transceivers may be deployed to extend transmission range even where no physical obstruction is preventing or inhibiting line of sight transmission. Also, the deployable data link transceivers need not be deployed exclusively by an unmanned vehicle, which will utilize the data link. Any unmanned, manned, surface or subsurface vehicle, craft, or position, on land, sea, air, or space may deploy the deployable data link transceivers described herein. Moreover, the deployable data link transceiver may be deployed as a projectile by conventional means, such as with explosives, electro-mechanical, compressed gas, etc., from the air, sea, land, or space.

Referring to FIG. 1, the deployable data link transceiver 120 is carried on board in addition to a payload 110. In yet other embodiments not shown, additional deployable data link transceivers 120 may be carried instead of a payload. In some embodiments, the deployable data link transceiver 120 need not be carried inside the UAV 105 as shown, and instead could be along the outside of the UAV 105 for deployment.

As discussed above, in addition to the visual sensor 140 onboard the UAV, some embodiments the deployable data link transceiver 120 include a sensor(s) 127, such as visual sensor 127. The visual sensor 127 provides additional visual intelligence, surveillance, and reconnaissance capability, which can be used as a secondary or a back up to the unmanned vehicle's capability, or as primary source for additional information.

Figure 6:
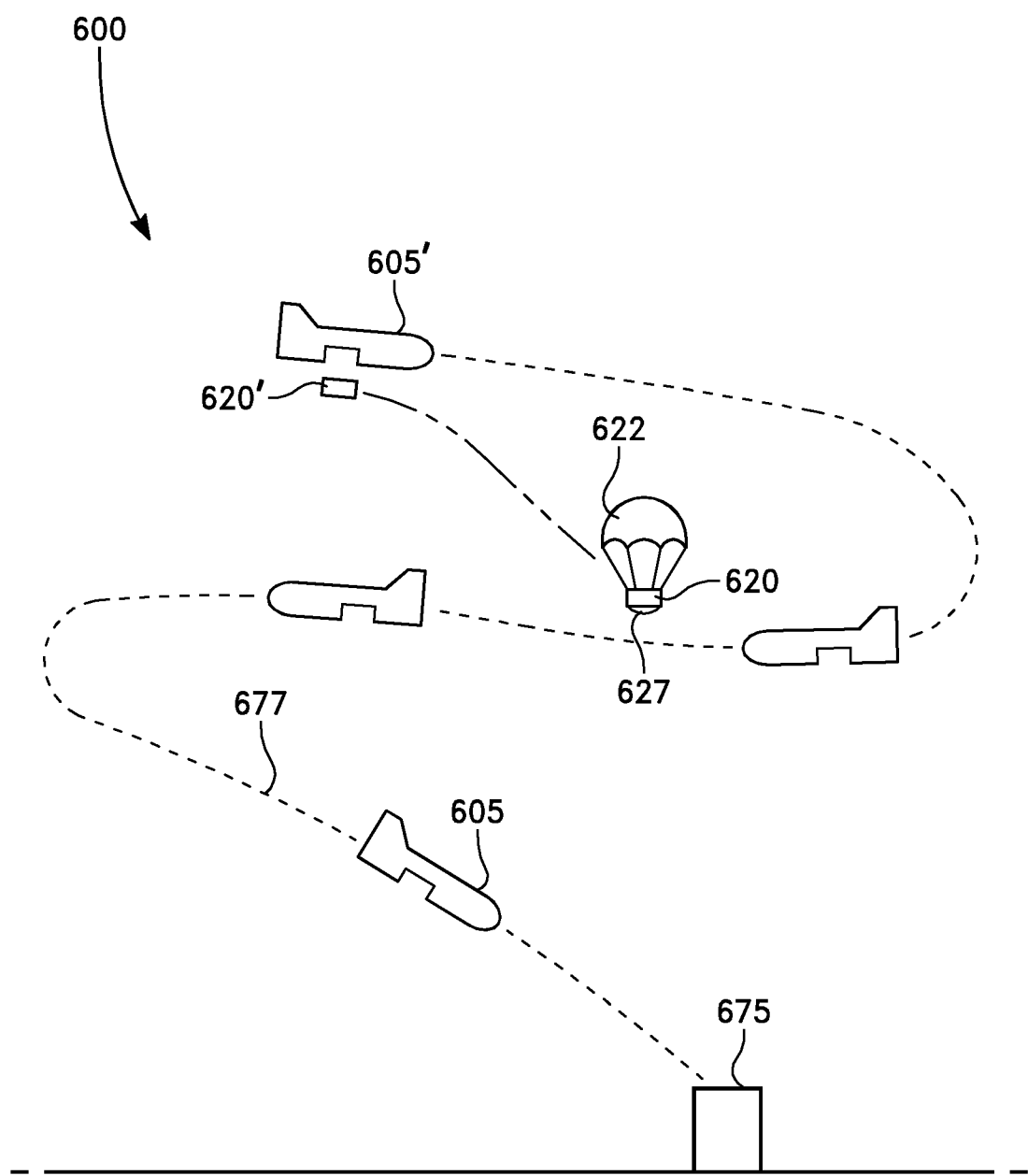
FIG. 6 is a simplified illustration of a scenario in which a deployable data link transceiver with a sensor is deployed to improve target damage assessment and/or mitigate ECM countermeasures.

Referring to FIG. 6, in one possible scenario, a weaponized unmanned aerial vehicle 605 travel over a target 675 (shown at 605') and deploys (shown at 620') the deployable data link 620, taking into account wind, target movement, anticipated target location, etc., so that it floats down over the target 675. While the deployable data link 620 is floating down by parachute 622, the sensor 627, e.g. visual sensor(s), looks downward toward the target 675, as the unmanned aerial vehicle 605 proceeds into/in its attack run terminal homing mode or terminal phase 677 dive and engages the target 675. The terminal homing mode is discussed in U.S. Patent Application 2010/0198514A1, by Carlos Thomas Miralles, published Aug. 5, 2010, entitled MULTIMODE UNMANNED AERIAL VEHICLE, herein incorporated by reference in its entirety. Deploying a deployable data link 620 with a visual sensor 627 to view the target at impact and thereafter, provides immediate post target impact data, e.g. video, for better damage assessment. This allows better real time damage assessment, and/or better post mission damage assessment. Another important advantage of in some applications is mitigating electronic counter measures (ECM) employed by the target, or elsewhere, to interfere with the communication link. By having a deployable data link transceiver nearby, the effect of such counter measures on the UAV could be mitigated.

Figure 7:
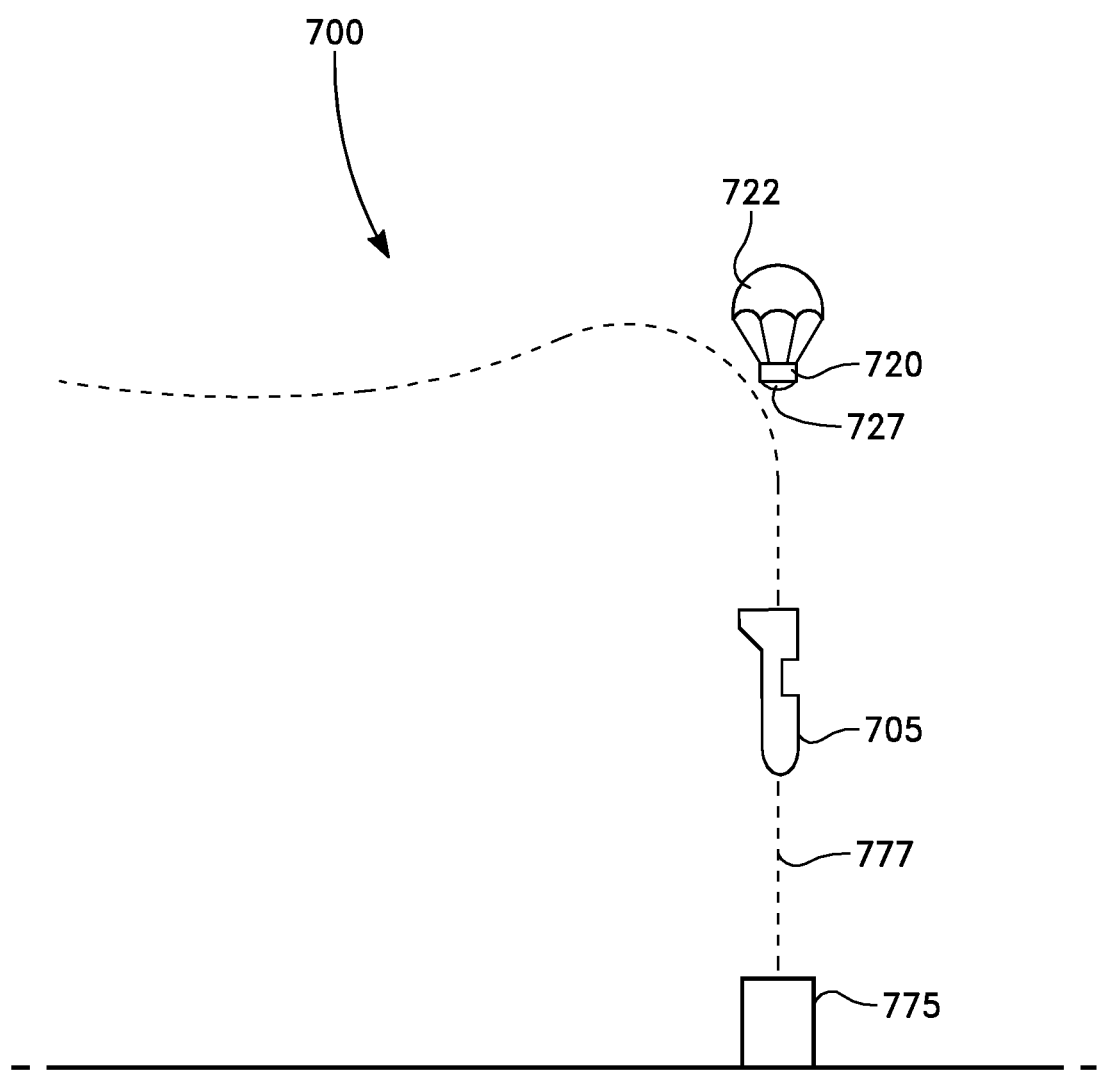
FIG. 7 is a simplified illustration of a scenario in which a deployable data link transceiver with a sensor is deployed to improve target damage assessment and/or mitigate ECM countermeasures.

Referring to FIG. 7, in a specific implementation, the deployable data link transceiver 720 may be deployed during the terminal phase 777 of the attack (during the final dive into the target) of a weaponized unmanned aerial vehicle 705. In this scenario, the terminal phase 777 of the unmanned aerial vehicle 705 is directly over and substantially vertically downward toward the target 775. Thus, while the deployable data link transceiver 720 is floating down by its parachute 722 with the sensor 727 facing downward toward the target, the unmanned aerial vehicle 705 proceeds in its attack run terminal phase 777 vertical dive and engages the target. The loitering deployable data link transceiver 720 senses and transmits the sensor 727 data obtained during the terminal phase 777 to another nearby node, such for example the unmanned aerial vehicle 705 controller/operator, for use in damage assessment.

Referring to FIG. 8A-C, in one specific case, the deployable data link transceiver 820 may be deployed during an angled dive terminal phase 877 flight path of an attack of a weaponized unmanned aerial vehicle 805. It is deployed such that a sensor 827, such as visual sensor(s), is angled from the horizontal and vertical, along, or parallel to, the expected flight path of the unmanned aerial vehicle 805. Thus, in some implementations, the angle of line of sight of the visual sensor(s) with respect to the horizontal matches the angle of the dive of the UAV. When the deployable data link 820 is deployed prior to, or during terminal phase, the deployment of the deployable data link 820 is done at a distance to the target sufficient to allow for the return of sensor data, e.g. imagery, of sufficient quality to improve battle damage assessment, as shown in FIG. 8C.

FIG. 8A shows the UAV 805 and deployable data link transceiver 820 both having a communication link back to the remote user's ground station (not shown). In some embodiments the communication link for the transceiver is established prior to being launched from the host UAV and in other embodiments the communications link is established after being launched from the UAV 805. FIG. 8B shows the transceiver 820 communicating back to the remote user the imagery, or other sensor data, and watching the UAV 805 head towards the target 875. At this time, in these embodiments, the UAV 805 may have its own communications link back to the remote user or may instead have a link to the transceiver 820 which in turn relays the communications to the remote user. This signal relay facilitates continued communications between the remote user and the UAV 805 even as the altitude of the UAV 805 lowers enough so as to otherwise be subject to a light of sight communications interference between the remote user and the UAV 805. Such low altitude interference, or even signal loss, may be due to obstructions such as hills, buildings, vegetation, and the like. This relay of the communications link through the transceiver 820 allows communications with, and control of, the UAV 805 as the UAV 805 approaches and attacks the target 875. In FIG. 8C the transceiver 820 continues to transmit its sensor data, e.g. a video feed, after the UAV 805 has attacked and damaged the target 875', and in so doing the transceiver 820 may facilitate a battle damage assessment by the remote user.

Referring to FIG. 8A-C, in this implementation the deployable data link transceiver 820 may be have descent control apparatus such as a low drag parachute 822, air brakes, fins, or other structural drag feature, or a, streamer, or other attached drag device to keep the sensor 827 oriented toward the target 875 at an approximately same trajectory, or an approximately same attitude, after the deployable data link transceiver 820 enters the airstream. In some embodiments, deployable data link transceiver 820 may have multiple sensor(s) 827, so that if/when the trajectory, or the attitude of the deployable data link transceiver 820 is not along the trajectory, or attitude of the unmanned aerial vehicle 805, the sensor(s) 827 are positioned to provide damage assessment, regardless.

In one example, the deployable data link transceiver 620, 720, or 820 may have three or more visual sensors positioned 360 degrees about the deployable data link transceiver 620, 720, or 820 so as to provide spherical or near spherical view around the deployable data link transceiver 620, 720, or 820.

Typically, with the implementations of FIGS. 6-8, and particularly in the implementations of FIGS. 7 & 8, because the terminal phases 705 and 805 can be short, the deployable data link transceiver 620, 720, and/or 820, should have systems powered on, functioning, and communication on the data link network, prior to deployment so that sensor data of the terminal phase 677, 777, or 877 can be captured immediately after deployment.

Figure 9:
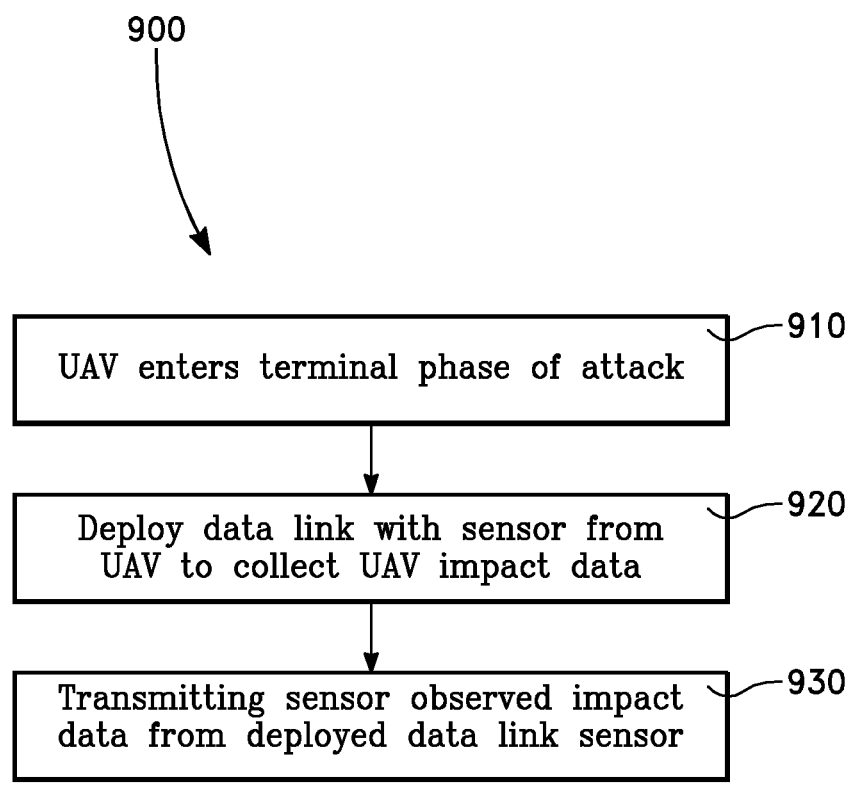
FIG. 9 is a flowchart of an implementation to improve target damage assessment.

Turning to FIG. 9, thus, target damage assessment can be improved by a method 900 which includes deploying from a UAV a deployable data link transceiver having a sensor 910, flying a terminal phase of an attack with the UAV 910, and transmitting sensor data of the attack using the deployed data link transceiver 930. The sensor data typically includes visual data of the attack, which can be used for real time battle damage assessment (BDA) or post attack battle damage assessment (BDA). The deployable data link transceiver may be deployed prior to the terminal phase of the attack, or during the terminal phase of the attack.

In various embodiments, the data link described herein may be a dynamic data link transceiver capable of being an arbiter node configured to control an operation of the client nodes or a client node. Thus, it may be part of a wireless network with dynamic transmission control having an arbiter and a plurality of client nodes, and wherein the arbiter is configured to control an operation of the client nodes by defining communications operation cycles and allocating a bandwidth to each of the plurality of client nodes on a cycle by cycle basis in response to requests for bandwidth from the plurality of client nodes, as described in U.S. application Ser. No. 12/878,989, published as US20110065469 A, 1 on Mar. 17, 2011, which claims the benefit of U.S. Provisional Application No. 61/241,854, filed on Sep. 11, 2009, by Grabowsky, et al., entitled DYNAMIC TRANSMISSION CONTROL FOR A WIRELESS NETWORK, both hereby incorporated by reference in their entireties.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action, which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A method for ensuring communication between a Unmanned Aerial Vehicle (UAV) and a remote UAV controller, the method comprising:
   a) launching a UAV comprising a visual sensor and a data link transceiver and a deployable data link transceiver, the deployable data link transceiver comprising a visual sensor;
   b) deploying the deployable data link transceiver from the UAV in a line of sight position with a UAV controller;
   c) flying the UAV into a non-line of sight position with respect to the remote UAV controller; and d) using the deployable data link transceiver visual sensor in addition to the UAV visual sensor to provide visual information to the UAV controller, and using the deployable data link transceiver to relay the UAV visual sensor data to the remote UAV controller.

2. The method of claim 1, wherein deploying the deployable data link transceiver in a line of sight position with a remote UAV controller comprises deploying an expendable data link transceiver.

3. The method of claim 2 further comprising at least partially inhibiting a functionality of the deployable data link transceiver after the deployable data link has completed its mission.

4. The method of claim 3, wherein at least partially inhibiting a functionality of the deployable data link transceiver comprises erasing sensitive mission data.

5. The method of claim 1, wherein flying the UAV into a non-line of sight position with respect to the remote UAV controller comprises flying to a terminal phase of a mission.

6. The method of claim 1 further comprising inhibiting a descent of the deployable data link transceiver after deployment of the deployable data link transceiver, and receiving, transmitting, and relaying the UAV visual sensor data to the remote UAV controller while the deployable data link transceiver is in descent.

* * * * *